(12) United States Patent
Michael et al.

(10) Patent No.: US 8,192,632 B2
(45) Date of Patent: Jun. 5, 2012

(54) PROCESS FOR SEPARATING AN AQUEOUS PHASE FROM AN OIL PHASE

(75) Inventors: Ralph Michael, Hamburg (DE);
Eberhard Runge, Hamburg (DE)

(73) Assignee: Mahle International GmbH (DE)

( * ) Notice: Subject to any disclaimer, the term of this patent is extended or adjusted under 35 U.S.C. 154(b) by 218 days.

(21) Appl. No.: 12/519,562

(22) PCT Filed: Dec. 17, 2007

(86) PCT No.: PCT/EP2007/064090
§ 371 (c)(1),
(2), (4) Date: Dec. 7, 2009

(87) PCT Pub. No.: WO2008/074786
PCT Pub. Date: Jun. 26, 2008

(65) Prior Publication Data
US 2011/0036788 A1    Feb. 17, 2011

(30) Foreign Application Priority Data

Dec. 18, 2006 (DE) .......................... 10 2006 059 714

(51) Int. Cl.
*B01D 17/028* (2006.01)
(52) U.S. Cl. ........ 210/744; 210/802; 210/104; 210/521; 210/540; 210/DIG. 5
(58) Field of Classification Search .................. 210/744, 210/800, 801, 802, 104, 521, 522, 538, 540; 210/DIG. 5
See application file for complete search history.

(56) References Cited

U.S. PATENT DOCUMENTS

| | | | | |
|---|---|---|---|---|
| 3,529,728 A | * | 9/1970 | De Jonge et al. | 210/522 |
| 3,645,398 A | * | 2/1972 | Fiocco | 210/DIG. 5 |
| 3,813,851 A | | 6/1974 | Eder | |
| 4,132,651 A | * | 1/1979 | deJong | 210/522 |
| 4,299,706 A | | 11/1981 | Smith | |
| 4,435,196 A | | 3/1984 | Pilkenrood | |
| 4,643,834 A | | 2/1987 | Batutis | |
| 4,722,800 A | * | 2/1988 | Aymong | 210/802 |
| 4,802,978 A | * | 2/1989 | Schmit et al. | 210/521 |
| 5,028,333 A | | 7/1991 | Wright et al. | |
| 5,520,825 A | * | 5/1996 | Rice | 210/802 |
| 6,164,458 A | | 12/2000 | Mandrin et al. | |
| 6,315,898 B1 | * | 11/2001 | Bull | 210/521 |

(Continued)

FOREIGN PATENT DOCUMENTS

DE    1210003    2/1966

(Continued)

OTHER PUBLICATIONS

English abstract for EP-0659457.

(Continued)

*Primary Examiner* — Christopher Upton
(74) *Attorney, Agent, or Firm* — Rader, Fishman & Grauer PLLC

(57) ABSTRACT

The present invention relates to a process for separating an aqueous phase from an oil phase of an oil-water mixture (6), which has a pressurized dewatering system (14) having multiphase separation profiles (15). According to the invention, it is essential that the pressurized dewatering system (14) operates in a plurality of stages. In addition, the invention relates to an apparatus (8) for carrying out the process of the invention.

19 Claims, 3 Drawing Sheets

U.S. PATENT DOCUMENTS

| | | |
|---|---|---|
| 6,827,865 B1 | 12/2004 | Fenwick |
| 2004/0159606 A1* | 8/2004 | Thacker et al. ............... 210/521 |

FOREIGN PATENT DOCUMENTS

| | | |
|---|---|---|
| DE | 8204957.2 | 12/1982 |
| DE | 3145964 | 12/1983 |
| DE | 2947154 | 12/1988 |
| DE | 9403773.6 | 6/1994 |
| DE | 4343754 | 7/1994 |
| DE | 29709633 | 12/1997 |
| DE | 10241518 | 3/2004 |
| EP | 0659457 | 6/1995 |
| EP | 0955076 | 4/1998 |
| GB | 2109695 | 6/1993 |

OTHER PUBLICATIONS

English abstract for DE-4343754.
English abstract for DE-10241518.

* cited by examiner

PROCESS FOR SEPARATING AN AQUEOUS PHASE FROM AN OIL PHASE

CROSS-REFERENCES TO RELATED APPLICATION

This application is a National Stage application which claims the benefit of International Application No. PCT/EP2007/064090 filed Dec. 17, 2007, which claims priority based on German Patent Application No. 102006059714.1, filed Dec. 18, 2006, both of which are hereby incorporated by reference in their entirety.

TECHNICAL FIELD

The present disclosure relates to a method and device for separating an aqueous phase from an oil phase of an oil-water mixture.

BACKGROUND

The separation of an aqueous phase from an oil phase, particularly of crude oil and oil products, can, in principle, be effected by means of physical, chemical or thermal methods. The latter two methods frequently entail the subsequent emergence of secondary contaminations in the form of an additional loading of the waste water with chemicals. On the other hand, thermal methods require large amounts of energy and therefore are likewise regarded as neither ecologically nor economically appropriate. In contrast thereto, physical methods represent an environmentally friendly alternative that is particularly important from the standpoint of increasingly stringent environmental requirements.

This method is, however, disadvantageous in that productivity of the method, that is to say a throughput rate amount per unit of time, is relatively low, resulting in a considerable amount of time being necessary for larger quantities of oil-water mixtures to be separated.

Document DE 102 41 518 A1 teaches of a method of the type in question for separating an intermittent secondary phase from an aqueous primary phase, in a first step water droplets of a predetermined controlled size being formed, which droplets are, in a second step, conducted on a multi-phase separator unit on which they coalesce, are directed into a sump trap, subsequent to which they are separated. The coalesced and separated water is collected in a water pocket from which it is drawn off. For further refining and separation, for example, it is possible to incorporate downstream a mechanical emulsifying breaker-stage as well as one or a plurality of hydrophobic membranes.

SUMMARY

The invention concerns the problem of providing for a method of the type in question an improved embodiment that will allow for large amounts of water and likewise large quantities of oil to be separated rapidly, simply and, especially, continuously.

This problem is solved according to the invention by the subject matter of the independent claims. Advantageous embodiments are the subject matter of the dependent claims.

The invention is based on the general idea of using a pressure discharge system, which works in multi-stages, with multi-phase separator units in order to separate an aqueous phase from an oil phase of an oil-water mixture, which pressure discharge system successively separates the water portions present in the oil-water mixture in multiple stages. In a first stage in a first flow generator, the separator units are designed as phase separator elements and are arranged in such a manner that turbulence is generated therein from the oil-water mixture flowing therethrough, thereby promoting the settling of water on the separator units. The separator units designed as phase separator elements preferably have a hydrophilic coating or are produced from a hydrophilic material, so that the water present in the oil-water mixture can be attracted by the separator units and settle thereon. By generating turbulence, the water droplets present in the oil-water mixture can join and can subsequently settle on the hydrophilic separators and be separated. At the same time, the turbulence in the flow cause so-called water pockets to break up, thereby facilitating a separation process. A water film that additionally behaves hydrophilically forms on the upper side, that is to say the inflow side, of the separator.

The separators, which are designed as laminar-phase separator elements, of the second flow generator in the second step generate a laminar, that is to say a steadied, flow of the oil-water mixture, thereby permitting larger droplets to form on the separators likewise designed to be hydrophilic. In the second flow generator, a considerably lower rate of flow exists than in the first flow generator since the flow cross-section is greater, more particularly a distance between the laminar-phase separators, than in comparison to the first stage.

In a third flow generator of a third stage, separators, which are designed as mechanical phase separators, are provided that are capable of separating even the smallest water portions, which are in the form of miniscule water droplets, still distributed in the oil-water mixture. The separators of the third stage are also designed to be hydrophilic so that the water portions that still remain in the oil-water mixture can coalesce and be separated. According to the invention, the solution to the problem addressed makes it possible to split even larger quantities of an oil-water mixture into its oil portions and its water portions and to separate the water from the oil phase. This is of considerable importance to modern refinement procedures since therein, large quantities of water are added to crude oil to improve its quality during a later process phase. These considerable quantities of water of up to 20% are indispensable to the refinement process, yet must be removed again from the oil-water mixture after refinement. Conventional methods, which are based almost exclusively on a separation of the water on the basis of gravitation, quickly reach the limit of their performance and are entirely unsuitable for large quantities. With the method according to the invention, it is, however, possible, even prior to refinement, to remove rapidly and simply large quantities of added water again, thereby permitting the refinement process to be conducted far more economically.

BRIEF DESCRIPTION OF THE DRAWINGS

The invention is furthermore based on the general idea that in order to conduct the method as described in the previous paragraph, a device must be used that has at least one pressure discharge system with multi-phase separators, the latter being formed from a hydrophilic material and/or having a hydrophilic coating. Such a hydrophilic coating or such a hydrophilic material can be steel, in particular polished stainless steel, and/or plastic, for example. Steel and plastic have hydrophilic surfaces that during the operation of the device according to the invention are continually coated with a water film. In contrast to water, hydrophilic surfaces have a contact angle that is less than 90°. Both steel as well as plastic are robust materials that can guarantee reliable operations and a long lifetime of the device according to the invention.

Advantageous embodiments explained in greater detail are each represented schematically in the drawings that show in.

DETAILED DESCRIPTION

Figure 1:
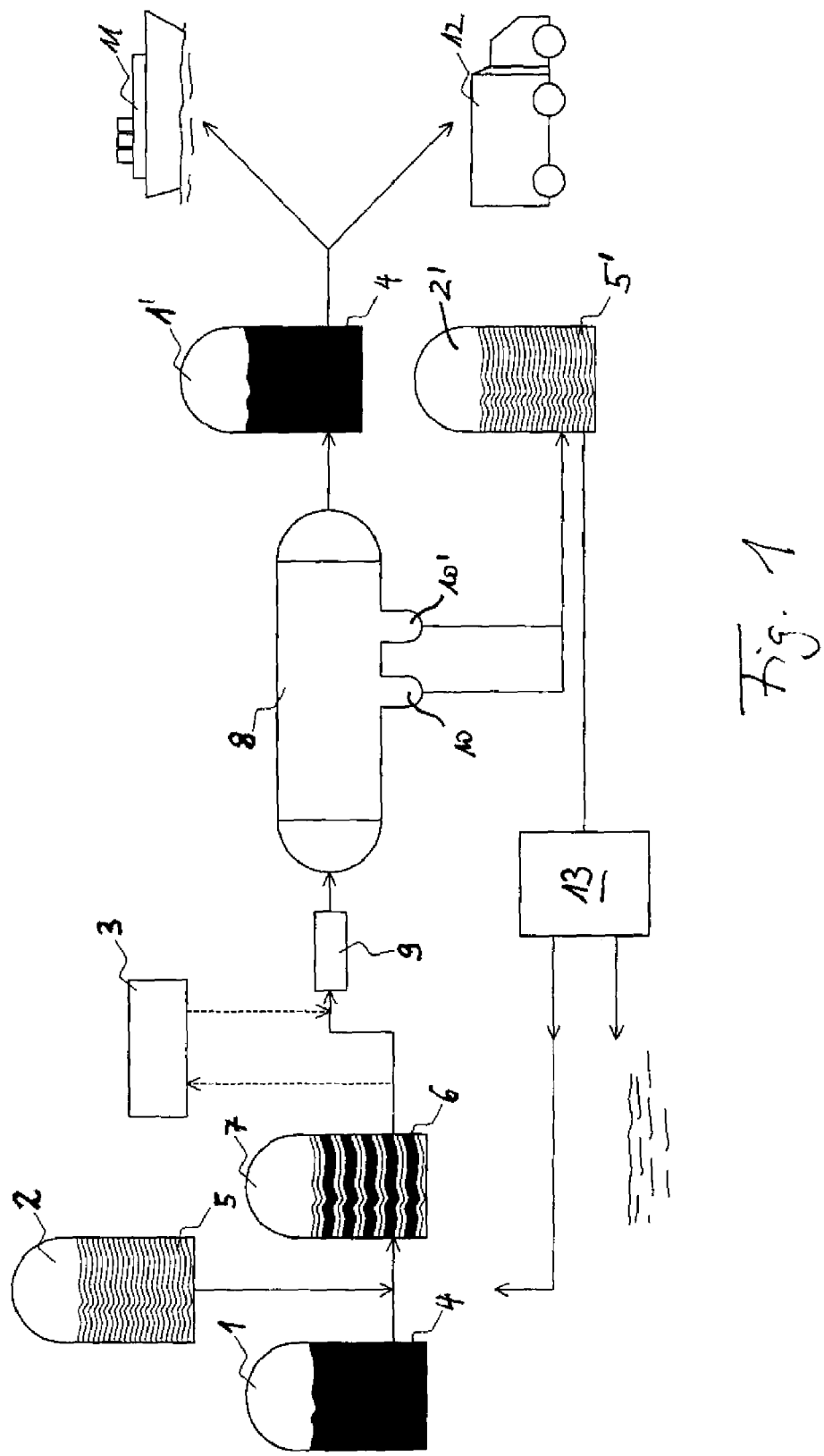
FIG. 1 a schematic diagram of equipment having a device for carrying out the method for removing water from oils.

According to FIG. 1, at the beginning of the method according to the invention, oil 4 is stored in an oil tank 1 and water 5 is stored in a water tank 2. To improve the quality of the oil 4, it is fed to a device 3, in particular a refining device 3, in which it is refined. Since the refining process requires that a substantial portion of water 5 be in the oil 4, water 5 from the water tank 2 is then admixed with the oil 4 from the oil tank 1 so that an oil-water mixture 6 results that is intermediately stored in a tank 7 intended for that purpose. Proceeding from the tank 7, the oil-water mixture 6 travels by way of the refining device 3 in which it is refined, to a device 8 in which the water portions are removed again from the oil-water mixture. Thereafter, the oil-water mixture 6 arrives in a special mixing unit 9 in which a water droplet spectrum, briefly also called a controlled-water drop (CWD), is generated. This water droplet spectrum necessary for the separation of the water from the oil 4 is indispensable for optimal water separation in the following device 8. The device 8 may, according to its use, have a diameter of up to many meters and effect a continuous water separation that is so large it does not prevent a conventional process speed. In the device 8 according to the invention, the separated water 8 sinks in previously precisely defined trajectories, and collects in water collection chambers 10, 10' provided therefor from which it can be guided to an additional water tank 2'. The oil 4 that has preferably been completely purified of the water portions arrives in an additional oil tank 1' from which it is transported, for example, by ship 11 or overland 12 to a refinery that is not shown. The separated water 5' can, for example, be processed in an oil removal system 13 and is either supplied anew to the entire process or is disposed of.

Figure 2:
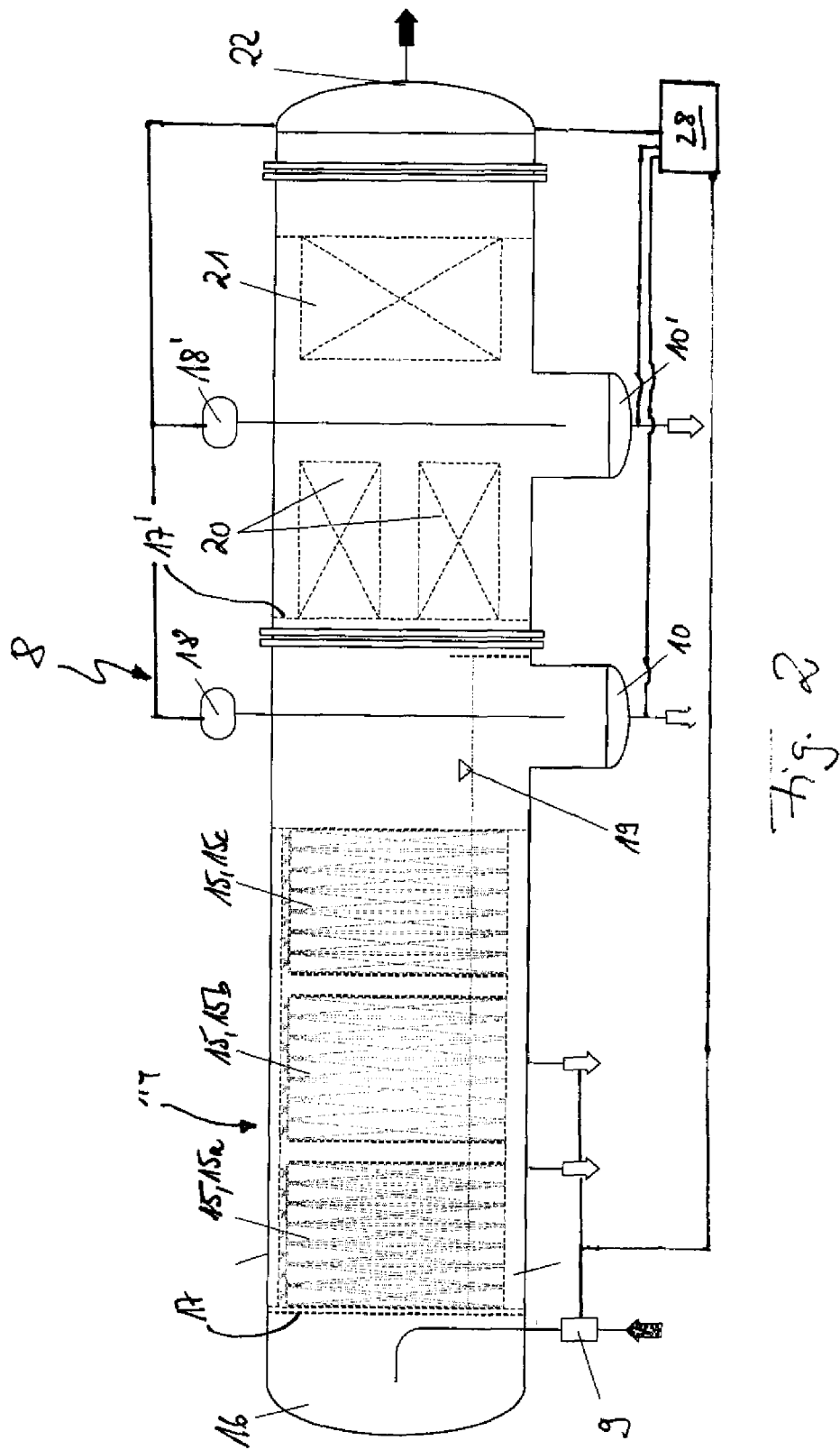
FIG. 2 a detailed design of the device according to the invention for carrying out the method according to FIG. 1.
Figure 3:
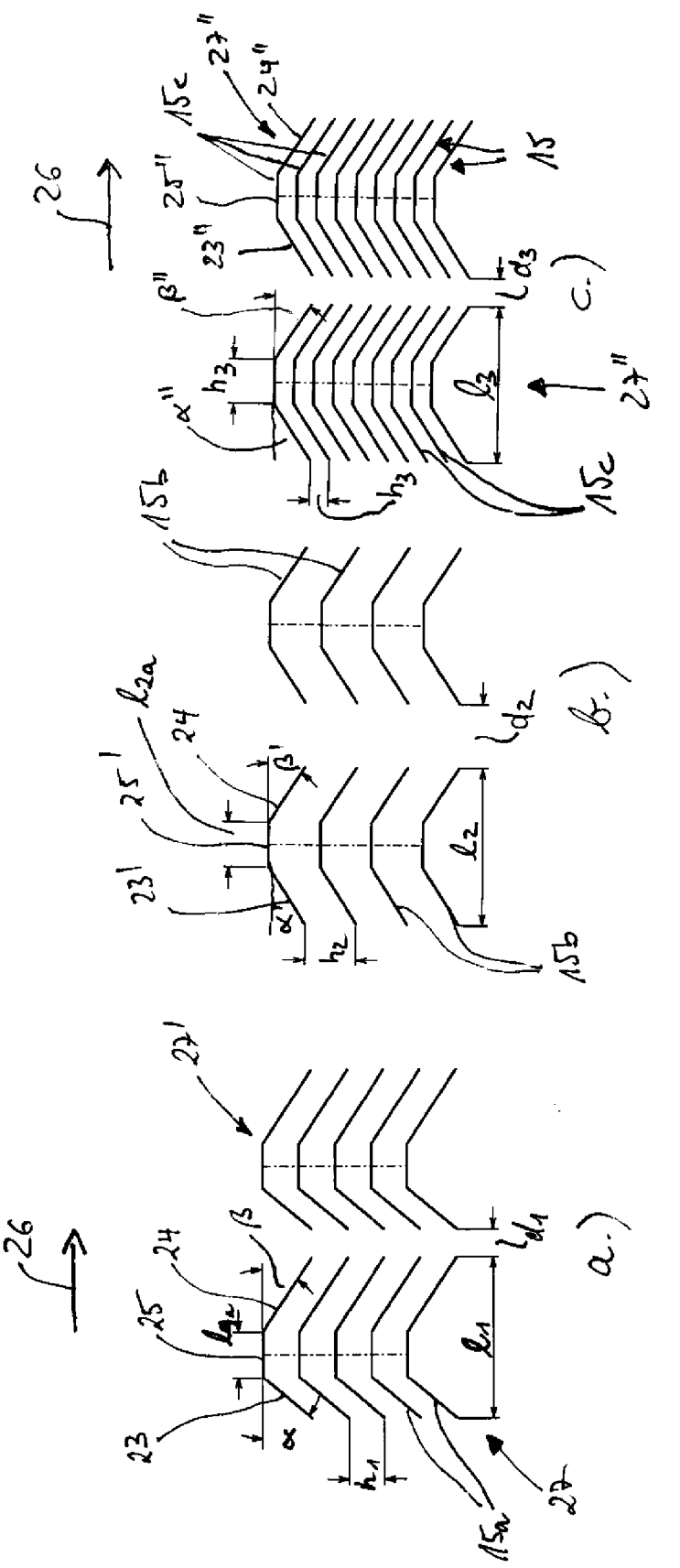
FIG. 3 a detailed view of a possible separator of a pressure discharge system of the device according to the invention.

The device 8 according to the invention for separating the water phase from the oil phase of the oil-water mixture 6 comprises at least one pressure discharge system 14 that is schematically shown in FIG. 2 and is shown in detail in FIG. 3. The pressure discharge system 14 has so-called multi-phase separators 15 in flow generators connected one after the other, which multi-phase separators are formed from hydrophilic material and/or have a hydrophilic coating. The mixing apparatus 9 is arranged on the input side of the device 8, as can be seen in FIGS. 1 and 2, in which mixing apparatus controlled, precisely-defined water droplets (CWD—controlled water drops) are generated. From there, the oil-water mixture 6 arrives in an antechamber 16 of the pressure discharge system 14 that forms a quiet zone and, on the one hand, effects a uniform distribution of the oil-water mixture 6 over the entire cross-section of the device 8 and, on the other hand, serves to dissipate the momentum of the entering, turbulent flow. By means of a distribution device 17, in particular by means of a dispersion distribution segment, the oil-water mixture 6 is distributed on a first stage of the pressure discharge system 14 that has three stages in total.

Separators 15 designed as phase separator elements 15a are arranged in the flow generator of the first stage and serve to both split the oil-water mixture 6 into water 5 and oil 4 as well as to generate a turbulent flow. Downstream from the separators 15 designed as phase separator elements 15a are separators 15 designed as laminar-phase separator elements 15b arranged in a second flow generator of the second stage, which separators serve to generate a laminar flow and to separate water 5 from the oil-water mixture 6. The separators 15a already promote a coalescing of the water droplets by means of their composition, in particular by means of their hydrophilic surfaces and their own given geometry or arrangement. In the third generator of the following stage with the separators 15 designed as laminar-phase separator elements 15b, during laminar flow the wetting characteristics or an affinity of the separators 15b to water 5 is used in order to thereby be able to optimally use their droplet formation in the subsequent separators 15, in particular the separators 15 designed as mechanical phase separators 15c, of the third stage. By calculating the water droplet size resulting therefrom, the density difference and the set flow rate are adjusted by means of sensors 18 of a separation layer 19 specific to the oil-water mixture 6, which separation layer is held constant by a valve control, in particular an automatic valve control, in the water collection chamber 10. The water collected in the water collection chamber 10 can be discharged proportional to the production process.

For additional improved water separation, a mechanical emulsion breaker 20 can be provided which is arranged downstream from the separator 15. Such a mechanical emulsion breaker 20 is capable of separating the smallest water droplets that are in the μm-range. Moreover, a hydrophobic membrane 21 specifically intended for the specific application instance can optionally be provided directly before an installation outlet 22. The water separated in the mechanical emulsion breaker 20 and/or in the hydrophobic membrane 21 is then collected in the water collection chamber 10', which in this instance is arranged between both of the components 20, 21, by way of example, and after collection is discharged, if need be, in a process-appropriate manner. In this manner, a water level can be monitored by a sensor 18'.

The device 8 according to the invention is completed by a control apparatus 28 that ensures fully-automated operation, a monitoring of the sensors 18, 18', a monitoring of the pressures, rate of flow, heating, and pumps, the apparatus 8 being able to be manually as well as semi- or fully-automatically operated. Both the valves, which are not shown, on the water collection chambers 10, 10' as well as at least one of the sensors 18, 18' are connected with the control apparatus 28 so as to be able to communicate and in such a manner that said control apparatus can undertake the control of water discharge from at least one water collection chamber 10, 10'. As can likewise be seen in FIG. 2, a separation device 17' for levelling the oil-water mixture 6 is arranged upstream from the mechanical emulsion breaker 20.

The following will explain in greater detail the separation layers 15 flow generators of all of the three stages one after the other of the pressure discharge system 14 using FIGS. 3a to 3c.

According to FIG. 3a, the first flow generator in the first stage of the pressure discharge system 14 is shown as separators 15 designed with phase separator elements 15a. The phase separator elements 15a serve, on the one hand, to separate the oil-water mixture 6 into water 5 and oil 4 as well as to generate a turbulent flow. The separators 15a of the first stage have a flow-against surface 23 inclined at an angle α of approximately 50° to 60°, preferably 55°, with respect to the horizontal, which flow-against surface 23 diverts the oil-water mixture 6 upward. Moreover, separators 15a have a flow-off surface 24 inclined at an angle β of approximately 30° to 35°, preferably 33°, with respect to the horizontal, which flow-off surface 24 diverts or redirects the oil-water mixture 6 downward. An entire length $l_1$ of the separator 15a in the direction of flow 26 is preferably about 70 mm. A substantially horizontally extending joining surface 25 is provided between the flow-against surface 23 and the flow-off surface 24, both the profiles 15a as well as the profiles 15b and 15c being formed from a hydrophilic material and/or having a hydrophilic coating. Steel, preferably polished stainless steel, and/or plastic can be used as a hydrophilic material and/or as a hydrophilic coating. A vertical $h_1$ distance between the individual separators 15a is approximately 10 mm to 20 mm, preferably 14 mm. It is conceivable that a plurality of separators 15a are combined into a common cartridge 27, a plurality of cartridges 27, 27' being in turn designed so as to be assembled into a cross-section that can be flowed through in a parallel manner and/or so as to be arranged one following the other. FIG. 3a shows, by way of example, two rows, each of which has five separators 15a arranged one after the other in the direction of flow 26, a distance $d_1$ of preferably 15 mm being maintained between the two cartridges 27 and 27'. A length $l_{1a}$ of the joining surface 25 in the direction of flow 26 is between 15 mm and 25 mm, preferably in the area of 20 mm. By means of the geometric design and the arrangement of the profiles 15a, a breaking-up of water pockets can be achieved, a water film existing on the flow-against surfaces 23, the joining surfaces 25, and the flow-off surfaces 24, which water film itself, in turn, attracts water 5 from the oil-water mixture 6 and brings about its attachment to the corresponding surfaces 23, 24, 25.

According to FIG. 3b, the second flow generator of the second stage of the pressure discharge system 14 has separators 15 designed as laminar-phase separator elements 15b, which separators are designed to generate a laminar flow and to separate water from the oil-water mixture 6. The separators 15b of the second stage have a flow-against surface 23' inclined at an angle α' of approximately 30° to 35°, preferably 33°, with respect to the horizontal, which flow-against surface 23' diverts the oil-water mixture 6 upward, and said separators moreover have a flow-off surface 24' inclined at an angle β' of approximately 30° to 35°, preferably 33°, which flow-off surface 24' diverts the oil-water mixture 6 downward. In contrast to FIG. 3a, the angle α' is equally as large as the angle β'. A substantially horizontal extending joining surface 25' is provided between the flow-against surface 23' and the flow-off surface 24', a vertical distance $h_2$ between the individual separators 15b of the second stage being larger than that between the separators 15a of the first stage. The length $l_2$ in the direction of flow 26 is approximately 70 mm; the length $l_{2a}$ of the joining surface 25' in the direction of flow 26 is likewise approximately 20 mm. The vertical distance $h_2$ of approximately 16 mm is, however, greater than the vertical distance $h_1$ of the individual separators 15a of the first stage. A distance $d_2$ between individual separators 15b in the direction of flow 26 is preferably 30 mm, depending on the type of oil used. It goes without saying that the number or the direction of the separators 15b according to FIG. 3b as well as of the other separators 15a or 15c according to FIGS. 3a and 3c, respectively, is to be understood purely as an example, which is to say that another device or number or arrangement of the separators 15 is also intended to be comprised by the invention in so far as the separation of water 5 from the oil-water mixture 6 is thereby benefited.

According to FIG. 3c, the third flow generator of the third stage of the pressure discharge system 14 is represented with separators 15 designed as mechanical phase separators 15c, which separators serve to separate the water portions that still remain by causing them to coalesce. The measurements $l_3$ or $h_3$ or the angles α" and β" correspond substantially to those of the separators 15b of FIG. 3b, a vertical distance $h_3$ between the individual separators 15c of the third stage being less than that between the separators 15a of the first stage. The vertical distance $h_3$ is preferably in a range between 5 mm and 10 mm, more particularly at 8 mm. A distance $d_3$ in the direction of flow 26 between individual separators 15c is in a range between 5 mm and 15 mm, preferably at approximately 10 mm.

Overall, with the separators 15a to 15c of the pressure discharge system 14, a separation degree of over 95% of the water present in the oil-water mixture 6 can be achieved.

All of the features represented in the description and in the following claims can be pertinent to the invention individually and collectively in arbitrary combination.

The invention claimed is:

1. A method for separating an aqueous phase from an oil phase of an oil-water mixture with a pressure discharge system having multi-phase separators, comprising:
   operating the pressure discharge system in multiple sequential stages, wherein the discharge system is configured, such that the oil-water mixture flows substantially in a horizontal direction;
   including a first stage, wherein the oil-water mixture is split into oil and water by at least one phase separator element, the at least one phase separator generates turbulence that promote a settling of water on the separators, wherein the at least one phase separator includes an inclined flow-against surface, thereby diverting the oil-water mixture upward, and wherein the at least one phase separator includes a flow-off surface configured at an opposing angle, thereby diverting the oil-water mixture downward;
   including a second stage, wherein water is further separated from the oil-water mixture and a laminar flow is generated by at least one laminar-phase separator element, wherein the at least one laminar-phase separator element includes an inclined flow-against surface, the incline is less than the incline of the flow-against surface of the first stage, said flow-against surface diverting the oil-water mixture upward, and wherein the at least one laminar-phase separator includes a flow-off surface configured at an opposing angle, thereby diverting the oil-water mixture downward;
   including a third stage, wherein at least one remaining water portion is coalesced and separated by at least one mechanical phase separator, wherein the at least one mechanical phase separator includes flow-against surface the incline is less than the incline of the flow-against surface of the first stage, said flow-against surface diverting the oil-water mixture upward, and wherein the at least one mechanical phase separator includes a flow-off surface configured at an opposing angle, thereby diverting the oil-water mixture downward;
   providing a planar horizontal joining surface between the flow-against surface and the flow off surface of each of the separators of the first, second and third stages, such that the oil-water mixture streams across the horizontal surface;
   providing a predetermined first vertical distance $h_1$ between two at least one phase separators of the first stage;
   providing a predetermined second vertical distance $h_2$ between two at least one laminar-phase separators of the second stage, wherein the vertical distance $h_2$ is greater than the vertical distance $h_1$ of the separators of the first stage; and providing a predetermined third vertical distance $h_3$ between two at least one mechanical phase separators of the third stage, wherein the vertical distance $h_3$ is less than the vertical distance $h_1$ of the separators of the first stage.

2. The method as specified in claim 1, further comprising, configuring the at least one phase separator flow-against surface incline at an angle $\alpha \approx 50°$ to $60°$ with respect to a horizontal; configuring the at least one phase separator flow-off surface opposing incline angle at an angle $\beta \approx 30°$ to $35°$ with respect to the horizontal; and configuring the first predetermined vertical distance ($h_1$) between at least two of the at least one separators at approximately 10-20 mm.

3. The method as specified in claim 1, further comprising, configuring the at least one laminar-separator flow-against surface incline at an angle $\alpha' \approx 30°$ to $35°$ with respect to a horizontal; configuring the at least one laminar-separator flow-off surface opposing incline angle at an angle $\beta' \approx 30°$ to $35°$ with respect to the horizontal; and configuring the second predetermined vertical distance ($h_2$) between the two at least one laminar-separators at a distance that is greater than the first predetermined vertical distance.

4. The method as specified in claim 1, further comprising, configuring the at least one mechanical separator flow-against surface incline at an angle $\alpha'' \approx 30°$ to $35°$ with respect to a horizontal; configuring the at least one mechanical separator flow-off surface opposing incline angle at an angle $\beta'' \approx 30°$ to $35°$ with respect to the horizontal; and configuring the third predetermined vertical distance ($h_3$) between the two at least one mechanical separators at a distance that is less than the first predetermined vertical distance.

5. A device for separating an aqueous phase from an oil phase of an oil-water mixture, comprising:

at least one pressure discharge system having multi-phase separators, wherein the separators are at least one of formed from a hydrophilic material, and have a hydrophilic coating, the pressure discharge system is configured, such that the oil-water mixture flows substantially in a horizontal direction with the plurality of consecutively configured multi-phase separators, the discharge system comprising, a first flow stage, including at least one phase separator, the first stage configured to generate a turbulent flow for separating an oil-water mixture, wherein the at least one phase separator includes an inclined flow-against surface configured to divert the oil-water mixture upward, wherein the at least one phase separator includes an opposite incline flow-off surface configured to divert the oil-water mixture downward;

a second stage, wherein water is further separated from the oil-water mixture and a laminar flow is generated by at least one laminar-phase separator element, wherein the at least one laminar-phase separator element includes an inclined flow-against surface the incline is less than the incline of the flow-against surface of the first stage, said flow-against surface diverting the oil-water mixture upward, and wherein the at least one laminar-phase separator includes a flow-off surface configured at an opposing angle, thereby diverting the oil-water mixture downward;

a third stage, wherein at least one remaining water portion is coalesced and separated by at least one mechanical phase separator, wherein the at least one mechanical phase separator includes a flow-against surface, the incline is less than the incline of the flow-against surface of the first stage, said flow-against surface diverting the oil-water mixture upward, and wherein the at least one mechanical phase separator includes a flow-off surface configured at an opposing angle, thereby diverting the oil-water mixture downward;

a substantially horizontal joining surface configured between each of the flow-against surface and the flow-off surface of the first stage, the second stage and the third stage;

a predetermined vertical distance $h_1$ is configured between two at least one phase separators the individual separators, in a second stage;

a vertical distance $h_2$ is provided between the individual separators (15b) of the second flow generator and is greater than that of the at least one phase separator; and a vertical distance $h_3$ is provided between the individual separators of the third flow generator and is less than that of the phase separator.

6. The device as specified in claim 5, wherein at least one of a steel, and plastic is used as the selected one of the hydrophilic material and hydrophilic coating.

7. The device as specified in claim 6, wherein the steel is polished stainless steel.

8. The device as specified in claim 6, wherein the separators are combined in a into a common cartridge, and wherein a plurality of cartridges are provided so as to be assembled into a cross-section that can be flowed through in at least one of a parallel manner and arranged one following the other.

9. The device as specified in claim 6, wherein at least one of the following is selected:
   i. a mechanical emulsion breaker is provided that is arranged downstream from the separator, and
   ii. a hydrophobic membrane is provided that is arranged downstream from the separator.

10. The device as specified in claim 5, wherein the separators are combined in a into a common cartridge, and wherein a plurality of cartridges are provided so as to be assembled into a cross-section that can be flowed through in at least one of a parallel manner and arranged one following the other.

11. The device as specified in claim 5, wherein at least one of the following is selected:
   i. a mechanical emulsion breaker is provided that is arranged downstream from the separator, and
   ii. a hydrophobic membrane is provided that is arranged downstream from the separator.

12. The device as specified in claim 11, wherein at least one sensor is arranged between at least one of the following:
   i. the pressure discharge system and the mechanical emulsion breaker and
   ii. the mechanical emulsion breaker and the hydrophobic membrane, wherein the at least one sensor detects a water portion.

13. The device as specified in claim 12, wherein the at least one sensor is connected with a control apparatus so as to be able to communicate, wherein the control apparatus controls a discharge of water from at least one water collection chamber and controls a flow through the device.

14. The device as specified in claim 12, wherein a separation device for levelling the oil-water mixture is arranged upstream from at least one of the pressure discharge system, the mechanical emulsion breaker, and the hydrophobic membrane.

15. The device as specified in claim 11, wherein a separation device for levelling the oil-water mixture is arranged upstream from at least one of the pressure discharge system, the mechanical emulsion breaker, and the hydrophobic membrane.

16. The device as specified in claim 5, wherein
the at least one phase separator flow-against surface incline is at an angle $\alpha \approx 50°$ to $60°$ with respect to a horizontal, wherein the at least one phase separator flow-off surface incline is at an angle $\beta \approx 30°$ to $35°$ with respect to the horizontal, and
wherein the first predetermined vertical distance ($h_1$) is approximately 10-20 mm.

17. The device as specified in claim 5, wherein
the at least one laminar-separator flow-against surface incline is at an angle $\alpha' \approx 30°$ to $35°$ with respect to the horizontal, wherein the flow-off surface incline is at an opposing angle $\beta' \approx 30°$ to $35°$ with respect to the horizontal, and
wherein the second predetermined vertical distance ($h_2$) is greater than that of the phase separators.

18. The device as specified in claim 5, wherein
the at least one mechanical separator flow-against surface incline is at an angle $\alpha'' \approx 30°$ to $35°$ with respect to the horizontal, wherein the at least one mechanical separator flow-off surface incline is at an opposing angle $\beta'' \approx 30°$ to $35°$ with respect to the horizontal, and
wherein the third predetermined vertical distance ($h_3$) is less than that of the phase separators.

19. A device for separating an aqueous phase from an oil phase of an oil-water mixture, comprising:
at least one pressure discharge system having multi-phase separators, wherein the separators are at least one of formed from a hydrophilic material and coated with a hydrophilic coating, the pressure discharge system is designed in multiple stages and has, as separators, in the direction of a plurality of flow generators, which are positioned one after the other at least consecutively, in a first stage, a second stage and a third stage in a horizontal direction;
a first flow generator of the first stage includes a plurality of phase separators for separating an oil-water mixture, the first flow generator generates a turbulent flow,
wherein the phase separators of the first flow generator each have a flow-against surface inclined at an angle $\alpha \approx 50°$ to $60°$ with respect to a horizontal, said flow-against surface diverting the oil-water mixture upward,
wherein the phase separators of the first flow generator each have a flow-off surface inclined at an angle $\beta \approx 30°$ to $35°$ with respect to the horizontal, said flow-off surface diverting the oil-water mixture downward, and
wherein the phase separators of the first flow generator each have a substantially horizontal joining surface configured between the flow-against surface and the flow-off surface with a vertical distance $h_1$ of approximately 10-20 mm configured between the individual phase separators;
a second flow generator of the second stage includes a plurality of laminar-phase separator elements for generating a laminar flow and for separating water from the oil-water mixture,
wherein the laminar-phase separators of the second flow generator each have a flow-against surface inclined at an angle $\alpha' \approx 30°$ to $35°$ with respect to the horizontal, said flow-against surface diverting the oil-water mixture upward,
wherein the laminar-phase separators of the second flow generator each have a flow-off surface inclined at an opposing angle $\beta' \approx 30°$ to $35°$, said flow-off surface diverting the oil-water mixture downward,
wherein the laminar-phase separators of the second flow generator each have a substantially horizontal joining surface configured between the flow-against surface and the flow-off surface with a vertical distance $h_2$ configured between the individual laminar-phase separators of the second flow generator, the vertical distance between the laminar-phase separators is greater than that of the phase separators of the first flow generator; and
a third flow generator of the third stage includes a plurality of mechanical phase separators for coalescing and separating at least one remaining water portion,
wherein the mechanical separators of the third flow generator each have a flow-against surface inclined at an angle $\alpha'' \approx 30°$ to $35°$ with respect to the horizontal, said surface diverting the oil-water mixture upward,
wherein the mechanical separators of the third flow generator each have a flow-off surface inclined at an opposing angle $\beta'' \approx 30°$ to $35°$, said surface diverting the oil-water mixture downward, and
wherein the mechanical phase separators of the third flow generator each have a substantially horizontal joining surface configured between the flow-against surface and the flow-off surface with a vertical distance $h_3$ configured between the individual mechanical phase separators of the third flow generator, the vertical distance between the mechanical phase separators is a distance less than that of the phase separators of the first flow generator.

* * * * *